Feb. 23, 1960 D. R. PEARY ET AL 2,925,761
PORTABLE PHOTOGRAPHIC FILM DEVELOPING APPARATUS
Filed Sept. 21, 1955 7 Sheets-Sheet 1

Inventors
Donald R. Peary,
Rex E. Vincent,
By Merriam & Lorch,
Attys.

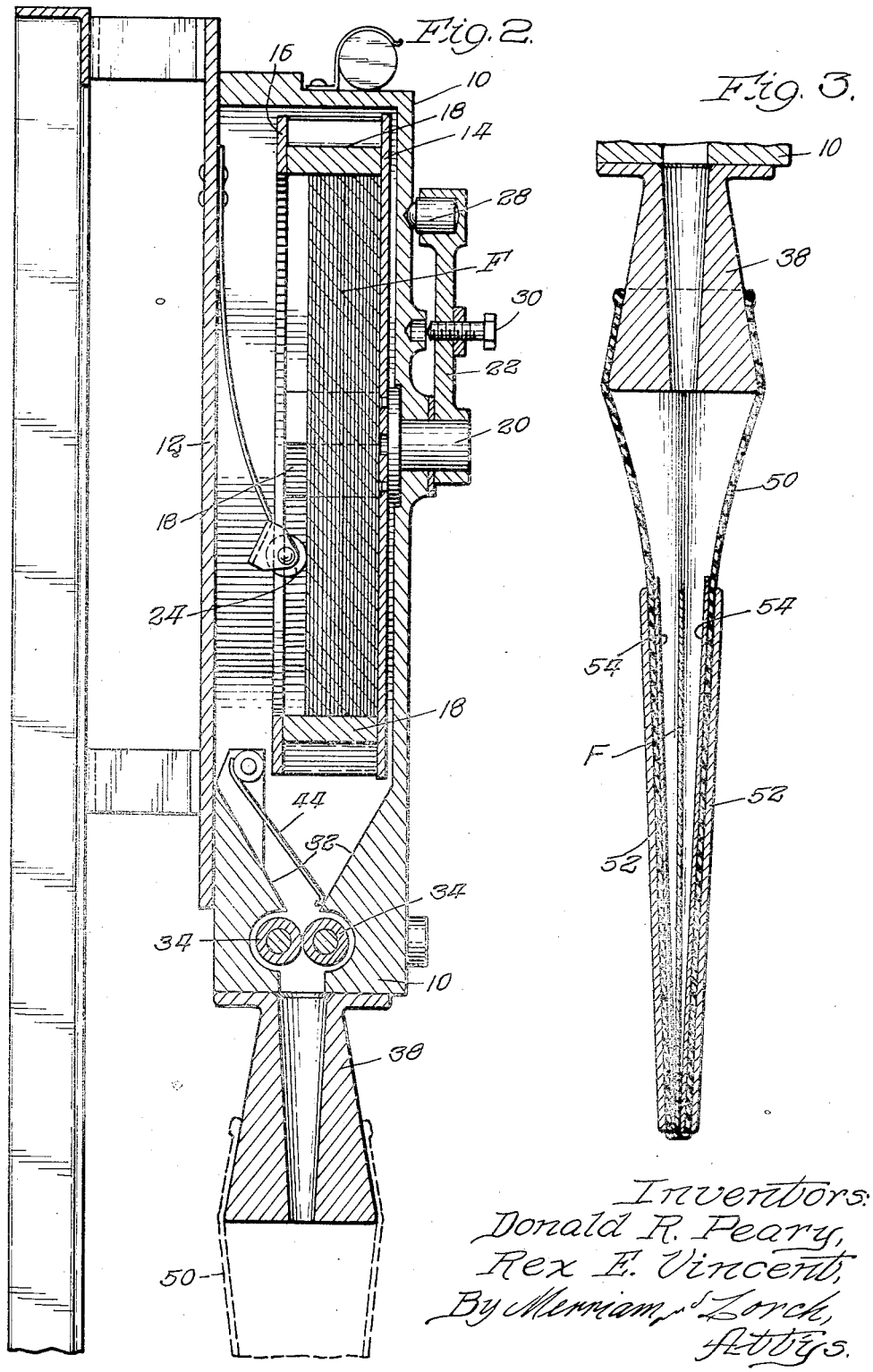

Feb. 23, 1960 D. R. PEARY ET AL 2,925,761
PORTABLE PHOTOGRAPHIC FILM DEVELOPING APPARATUS
Filed Sept. 21, 1955 7 Sheets-Sheet 3
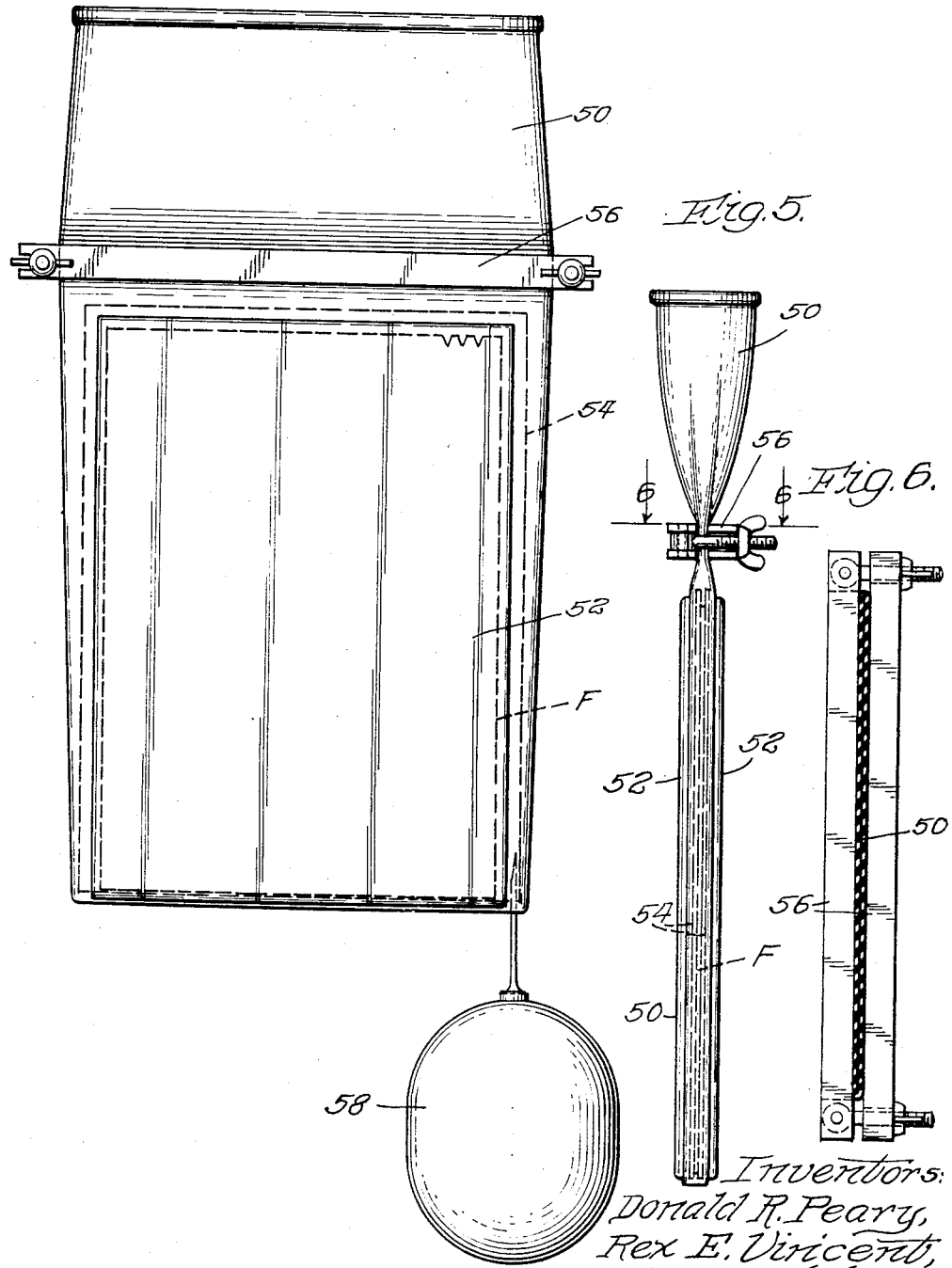

Feb. 23, 1960 D. R. PEARY ET AL 2,925,761
PORTABLE PHOTOGRAPHIC FILM DEVELOPING APPARATUS
Filed Sept. 21, 1955 7 Sheets-Sheet 4
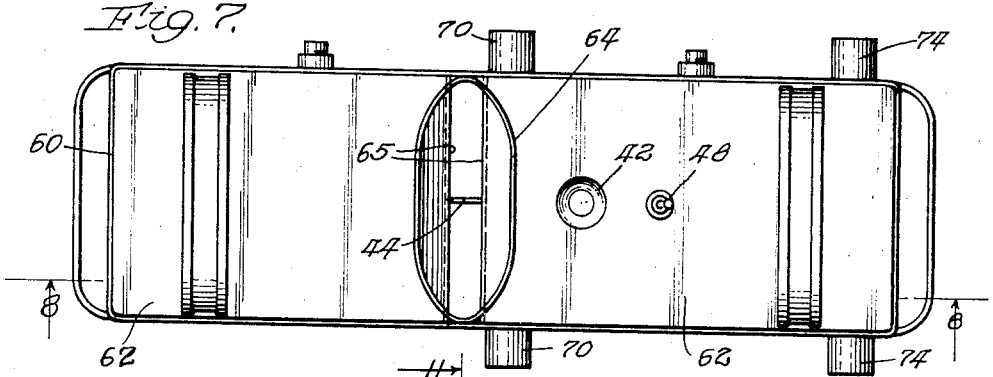
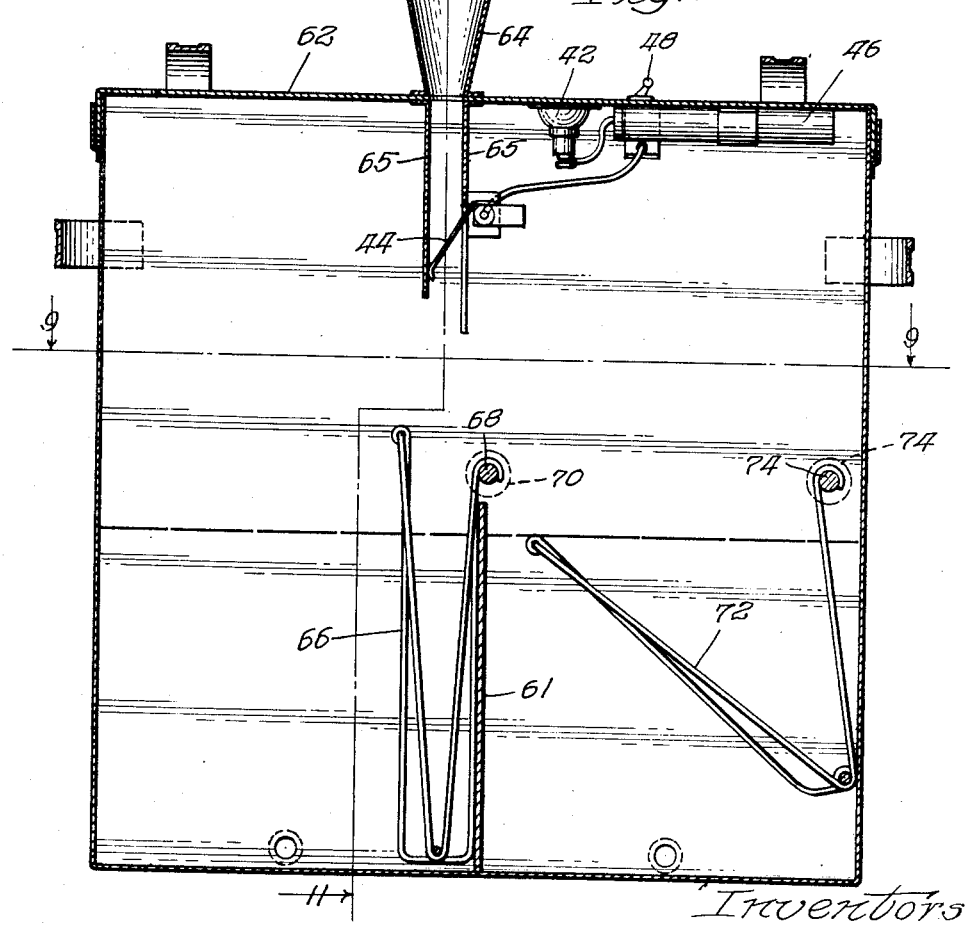
Inventors:
Donald R. Peary,
Rex E. Vincent,
By Merriam & Zorch,
Attys.

Feb. 23, 1960     D. R. PEARY ET AL     2,925,761
PORTABLE PHOTOGRAPHIC FILM DEVELOPING APPARATUS
Filed Sept. 21, 1955     7 Sheets-Sheet 5
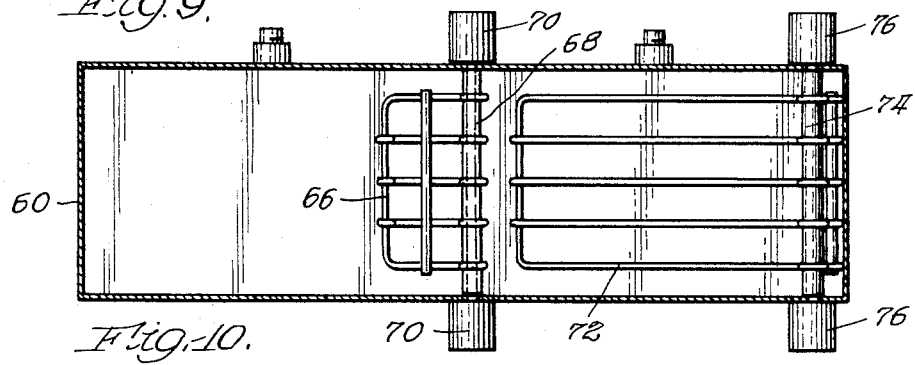
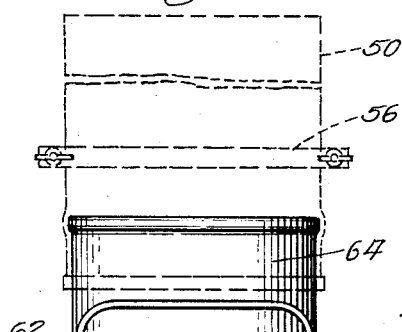
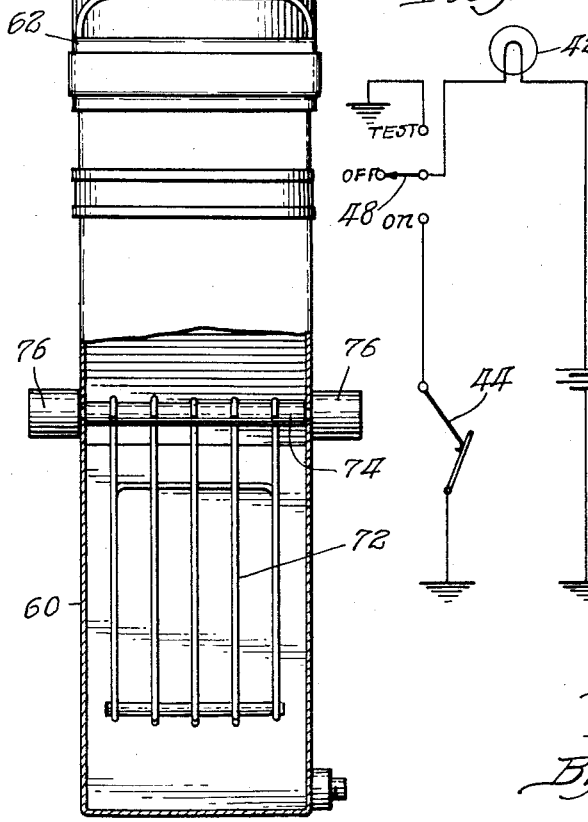
Inventors:
Donald R. Peary,
Rex E. Vincent,
By Merriam & Lorch,
Attys.

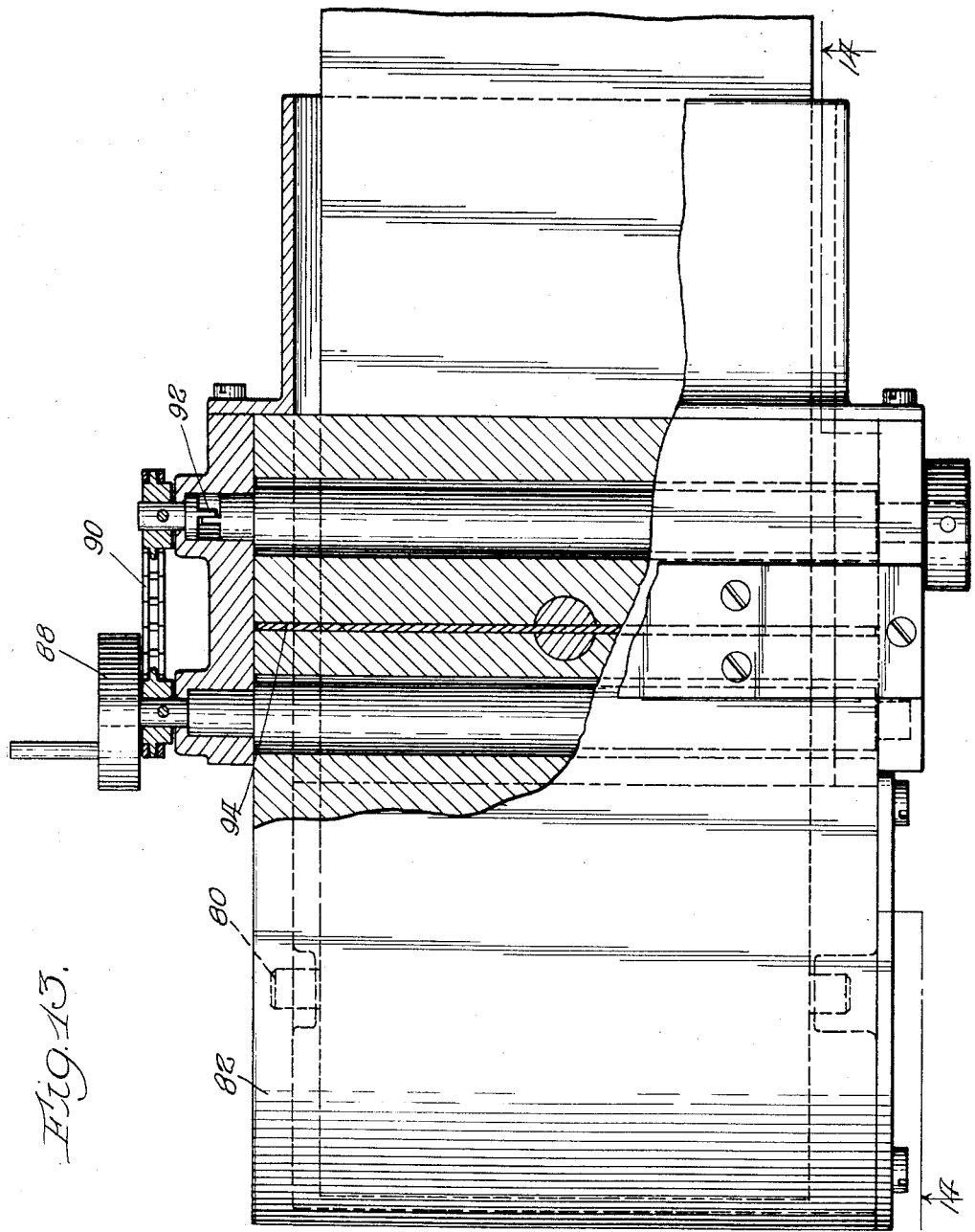

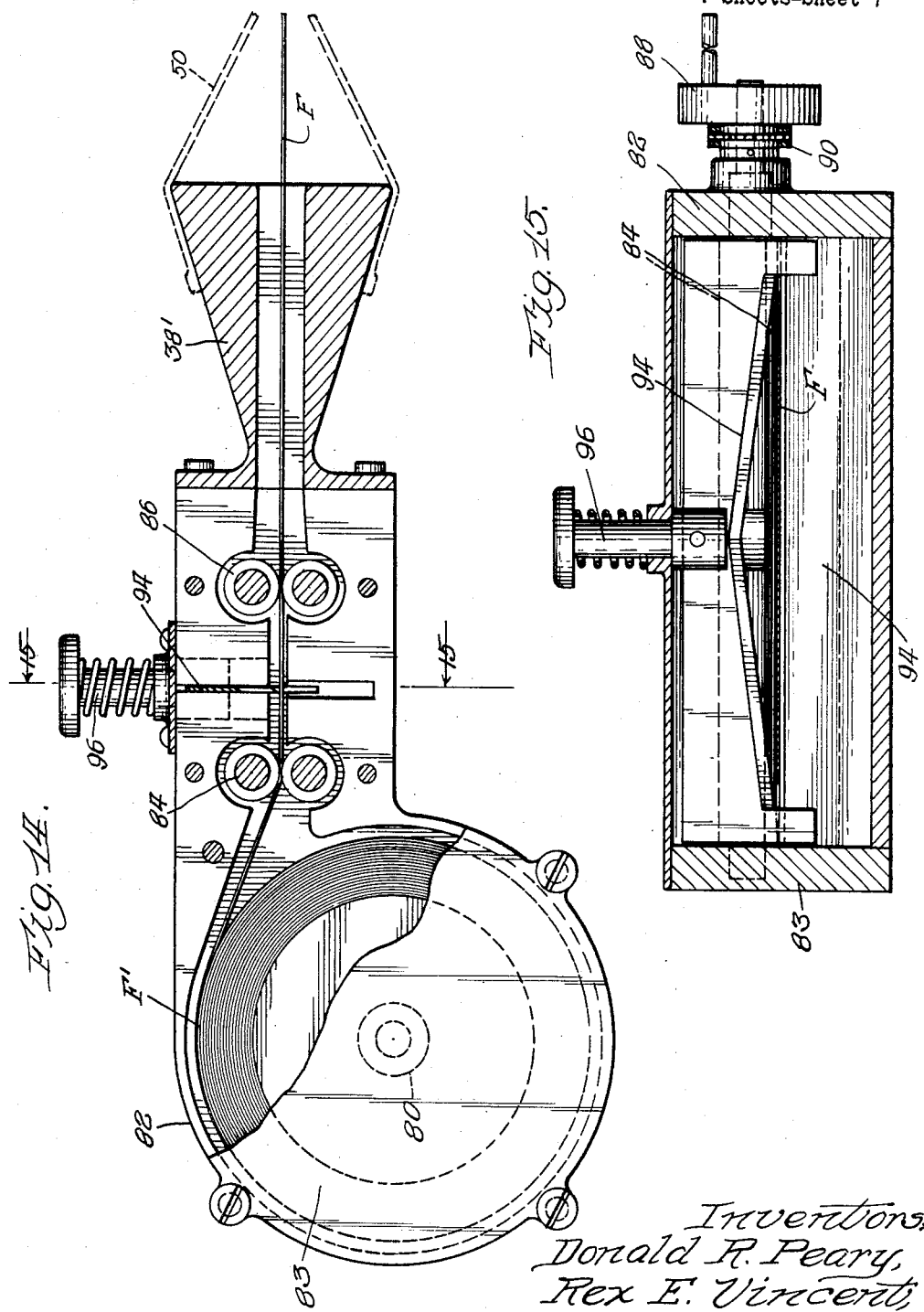

United States Patent Office 2,925,761
Patented Feb. 23, 1960

2,925,761

PORTABLE PHOTOGRAPHIC FILM DEVELOPING APPARATUS

Donald R. Peary, Western Springs, and Rex E. Vincent, Blue Island, Ill., assignors to Chicago Bridge & Iron Company Application September 21, 1955, Serial No. 535,688

4 Claims. (Cl. 95—19)

This invention relates to an apparatus and system for loading, exposing, and developing sensitized film such as X-ray film in daylight without the necessity of a darkroom.

In certain operations, it is becoming more and more the practice to take X-rays of work being done in the field as the work progresses. For example, in the erection of large tanks involving considerable welding, it is both desirable and now customary to take X-rays of the welding as it progresses. For this it is most desirable to have apparatus and a system for handling the sensitized film in the field under daylight conditions without the necessity of returning to a darkroom for loading or processing the film.

This is accomplished according to this invention by providing three units designed to cooperate together. The first is a film magazine which may be loaded with a supply of film at some conveniently located darkroom, not necessarily in the field, and then sent up to the field fully loaded. The second is a cassette or individual film holder adapted to receive a cut film from the magazine in daylight, support the film while it is being exposed, and then transfer it to the third unit, namely, a developing tank again in broad daylight. Thus the film can be loaded into the cassette, exposed and developed on the spot in the field without the necessity or use of a darkroom.

A better understanding of this invention will be had from the following description when read in connection with the accompanying drawings in which:

Figure 2 is a vertical transverse section approximately through the center of the film magazine shown in Figure 1;

Figure 3 is a transverse vertical section through a cassette constructed in accordance with this invention showing its application to the bottom or mouth of the magazine;

Figure 4 is a front elevation of the cassette illustrating the sealing device in position on the cassette and the air-evacuating bulb in position to evacuate air that may be trapped in the cassette;

Figure 5 is an end elevation of the cassette illustrating how the mouth is closed by the sealing clamp;

Figure 6 is a section taken approximately on line 6—6 of Figure 5;

Figure 7 is a plan view of the developing tank constructed according to this invention;

Figure 8 is a vertical section taken approximately along line 8—8 of Figure 7;

Figure 9 is a horizontal section taken approximately along line 9—9 of Figure 8;

Figure 10 is an end elevation of the developing tank with the lower portion broken away to show the internal construction and the cassette being shown in dotted lines attached to the inlet of the tank;

Figure 11 is a vertical transverse section taken through the end portion of the developing tank;

Figure 12 is a schematic wiring diagram of the indicating light;

Figure 13 is a top plan view of a modified form of magazine for containing roll film rather than cut film partially broken away to show the interior construction and arrangement;

Figure 14 is a vertical section taken along line 14—14 of Figure 13; and

Figure 15 is the section taken along line 15—15 of Figure 14 illustrating the cutting knife for severing the roll film.

Figure 1:
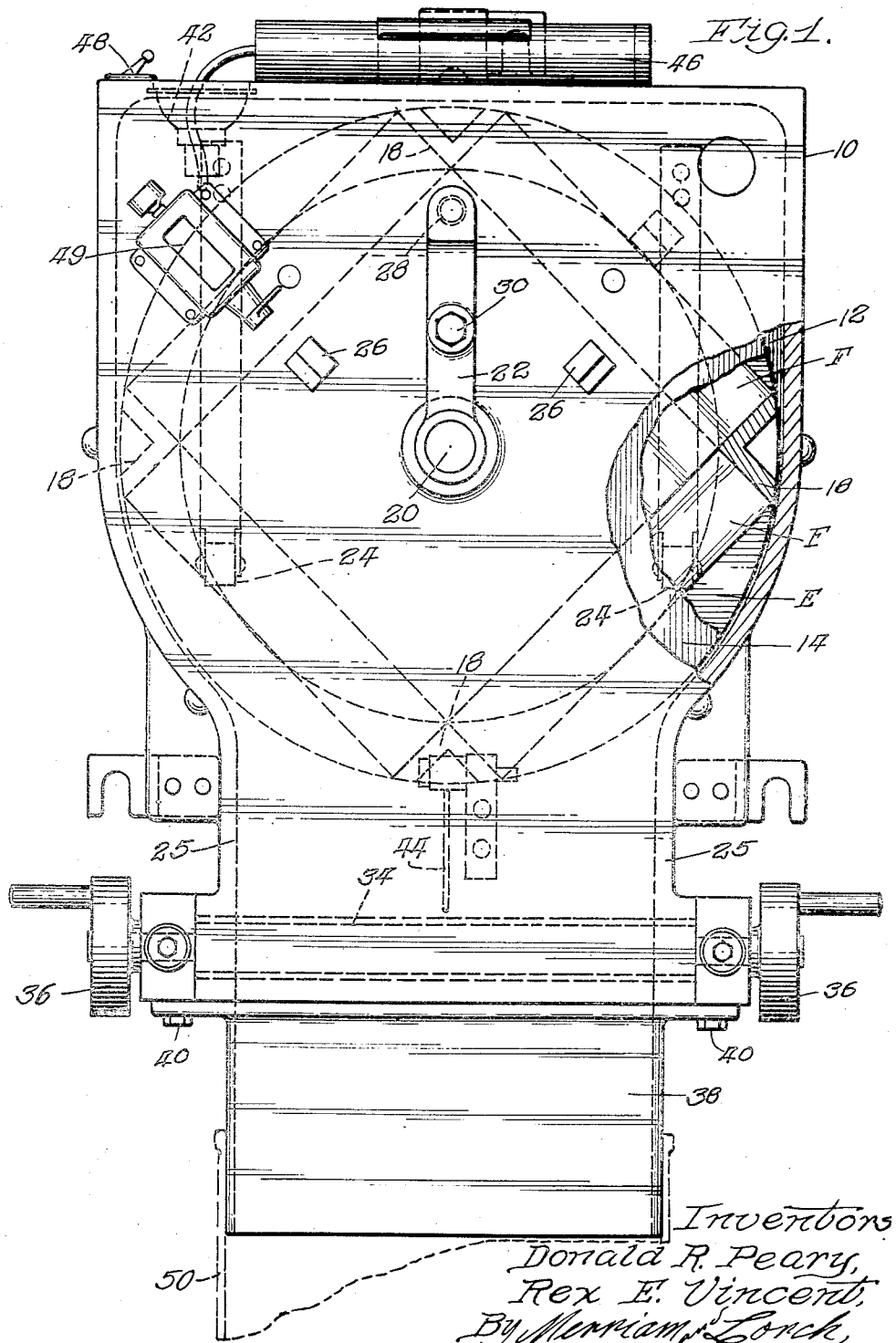
Figure 1 is a front elevation partially broken away of a film magazine or unit, constructed in accordance with this invention.

As shown more particularly in Figures 1 and 2, the first unit comprises a magazine for storing and dispensing the sensitized film and consists in general of a housing or casing 10 for receiving the film therein and adapted to be light-sealed by a cover plate 12 bolted or otherwise secured to the housing. Positioned within the housing for rotation therein is a film turret comprising an end plate 14 and a retainer ring detachably secured to the end plate by any suitable means, not shown, and held spaced from the end plate by four film guides 18. The turret is carried by pivot pin 20 journalled in the housing which pin also carries an external operating handle 22 upon its outer end by means of which the turret may be rocked as will be explained later.

The turret is designed to hold a plurality of cut films F, stacked alternately "crisscrossed" between the corner guides 18. That is, each succeeding film is turned 90° with respect to its next adjacent film, with the films lying between the guides. The cut films are held in position by a pair of spring-pressed rollers 24, carried by and projecting inwardly from the inside of the cover plate 12 and positioned to engage only the projecting end portions of the film when the turret is rocked to a discharge position for reasons which will appear later. Normally, the turret is positioned with one corner guide 18 at the bottom to prevent the films from dropping. When it is desired to discharge a film from the turret, the operating handle is rotated 45° to either the right or the left from the position of Figure 1, depending upon the previous movement, whereby the stack of films is rotated 45°. Such movements are limited by either stop member 26 projecting outwardly from the housing. This presents one short end of the film to the discharge end 25 of the casing 10. That is, when the turret is rocked by the manipulation of handle 22, either to the right or the left, the corner guide, which was at the bottom, will be moved to the right or left from the position shown in Figure 1. This positions one set of cut films with the bottom edges directly over the discharge end 25. In this position the rollers 24 engage the projecting ends of the other set of the cut film, thus permitting downward movement of the topmost vertically arranged cut film, between guides 18, to the bottom of the magazine while retaining the remaining film.

The remaining vertically arranged films will be retained in the magazine by the pressure of the rollers 24 on the extending ends of the horizontally arranged films which in turn exert sufficient pressure and thus resistance to prevent dropping of the other vertically arranged films. The horizontally arranged films are prevented from dropping by engagement with the sides of guides 18. After the turret has been rocked in one direction, it may be returned to the normal, or locked position and then rocked in the other direction until it engages the other stop 26. This movement will present the other group of cut films so that the topmost film will be free to drop between the guides 18 into the discharge end 25 of the casing.

In order that the handle and turret will be retained in its normal, or locked position, the outer end of the handle may be provided with a spring detent 28 engageable in a depression in the housing to releasably hold the turret in normal position. For positively locking the turret in this position, a locking screw 30 may be used to engage another depression in the casing.

When the cut films are dropped into the discharge end or mouth of the housing, they are guided by the inclined walls 32 thereof to a pair of ejector rollers 34, journalled in the housing and provided with operating knobs 36. By rotation of knobs 36 the ejector rollers 34 feed the released film into the film chute 38, attached to the discharge end 25 of the housing by any suitable means, such as cap screws 40.

In order that the operator will know when a film has left the turret and has about passed through the ejector rollers, an indicator light 42 is provided which is controlled by a film trip switch 44. The arrangement is such that switch 44 normally engages the side of the discharge end of the casing and causes indicator light 42, energized by ordinary "Penlite" batteries 45, carried in the housing 46, to be lighted whenever manual switch 48 is in the "on" position. When a film proceeds down through the discharge end of the casing it will move switch 44 out of contact, thus extinguishing the light momentarily until the trailing end of the film has cleared the switch. Thus, the operator knows that a film has cleared the discharge end of the casing. The circuit diagram for the indicator switch is shown in Figure 12. If desirable a counter 49 can be secured to the turret in position to be engaged by the handle to count the operations of the handle.

The second unit or cassette, as shown in Figures 3, 4, 5, and 6 is, in effect, a film holder for receiving the ejected cut film from the magazine, supporting it for exposure and permitting its transfer to the developing tank, all in daylight. The cassette consists of an envelope 50, of rubber or other suitable material, sealed at one end and open at the other end. The open end constitutes a mouthpiece capable of being stretched over the film chute 38, in light tight engagement therewith. Preferably, the cassette or envelope is provided with outer stiffening plates 52 and inner intensifying screens 54.

In order to insure that a film in the cassette is not exposed to light when the cassette is being removed from the chute, a clamp 56, Figures 4, 5, and 6 is provided for squeezing the open end of the cassette or its mouth together, as shown in the foregoing figures.

In order to insure that the intensifying screens are in contact with the film through the full area of the latter, it is desirable to exhaust whatever air may be trapped in the cassette and, for this purpose, a syringe 58, Figure 4, may be employed, i.e. injected through the bottom of the self-sealing cassette.

The third unit of the apparatus and system comprises a developing tank, shown more particularly in Figures 7 through 11. The tank consists of a light-proof body 60, preferably of stainless steel, provided with a light-proof cover 62, the latter having a mouthpiece 64 for receiving the mouthpiece of the cassette and from which two guide plates 65 depend. The body is preferably provided with two or more compartments formed by one or more partition walls 61, thus providing, in the illustrated tank, one compartment for the developer and the other for a quick stop or a fixer. Obviously, more compartments may be employed, if desirable. The tank is also provided with an indicator light 42, controlled by a film trip switch 65 as described in connection with the magazine so that the operator will know when the cut film has dropped from the cassette into the developing tank. The wiring diagram for this indicator light is also shown in Figure 12.

In order that the cut film may be transferred from one compartment to another at the prescribed times without exposing the film to daylight, the tank is provided with a film basket 66 immediately below the mouthpiece 64 and guides 65 to receive any film dropped in the mouthpiece. The basket is fastened to a shaft 68, journalled in the tank walls and having external hand knobs 70, by means of which the operator may raise the basket after the film has been developed in the first compartment and deposit it in a film rack 72, positioned in the second compartment. Rack 72 is carried by shaft 74, also journalled in the side walls of the tank and having external knobs 76 by means of which the operator may raise the basket to remove the film after it has been sufficiently fixed or otherwise treated by the solution in this compartment. If additional compartments are employed rack 72 may be used to transfer the film to the next compartment without exposing the film to light.

In Figures 13 through 15 there is shown a modified form of magazine for containing and dispensing rolled film instead of cut film. In this form a continuous roll of film F' is rotatably supported on a spindle 80, in a casing 82, provided with a cover 83, and is fed between two pairs of ejector rollers 84 and 86. The rollers are driven by handwheel 88, attached to one roller shaft, which in turn drives the other roller shaft through a sprocket and chain drive 90. The final pair of ejector rollers is also permitted to have limited movement through a suitable clutch 92 independently of the initial pair of ejector rollers, to permit withdrawal of the cut piece of film.

The desired length of film may be severed by a reciprocating cutter 94, operated by a spring-retractable plunger 96, after which the cut piece may be discharged into the film chute 38' and into the cassette 50.

It is believed that the operation of the foregoing apparatus and system is apparent from the foregoing description. Therefore, it will be only briefly summarized.

In operation, either magazine, i.e., the cut film magazine or the rolled film magazine, is loaded in any suitable darkroom and shipped to the point of use. At this point, which may be in the field, the cassette is loaded in daylight, if necessary, by stretching its mouth over the film chute of either type of magazine and the cut film is discharged by either rocking the turret or rotating the rollers 84 and 86 until a piece of film, after being cut, if the rolled film is used, is in the cassette. The mouth of the cassette is then positively closed by application of the clamp, any included air is ejected, and the cassette with its film is then ready for use, that is, exposure. After exposure the cassette is attached to the mouthpiece of the developing tank, the clamp is removed and the exposed film is permitted to drop into the film basket which is in the developing compartment of the tank below the fluid level as indicated. After development has taken place the operator swings the basket up which causes the developed film to be deposited in the film rack which is in the quick stop or the fixing solution, as the case may be. After sufficient time in this latter solution the tank cover can be removed and the film rack raised to permit the developed and fixed film to be removed. All of this can be done in broad daylight without the necessity of a darkroom. The term light tight has been used in a broad sense to include the exclusion of any media which would cause "exposure" of the film being handled.

It will be apparent to those skilled in the art that minor details of construction may be varied without departing from the spirit and scope of this invention as defined in the appended claims.

We claim:

1. A magazine for storing and dispensing sensitized film consisting of a housing opened upon one side, a cover for closing said side, a turret supported for rotation to rest at either of two positions in said housing, means exterior of said housing for rotating said turret selectively to said two positions, said turret having means for stacking a plurality of sheets of cut film therein with alternate sheets arranged at an angle to each other, means to retain said sheets in said turret when the latter is in a position other than said two positions and free for movement out of said turret in said two positions, means for securing all but one end sheet of the stack of sheets when said turret is in either one of said two positions, and means for ejecting film released from said turret from said housing.

2. A magazine as defined in claim 1 wherein said stacking means consists of four guides positioned in said turret and engaging the sides of said cut film and retaining said alternate sheets at an angle to each other while permitting the topmost of said sheets to slide between said guides when said turret is in either of its said two positions.

3. A magazine as defined in claim 1 wherein said securing means consists of spring pressed rollers engaging the end portions of said sheets.

4. A magazine as defined in claim 2 wherein said securing means consists of spring pressed rollers engaging the end portions of said sheets.

References Cited in the file of this patent

UNITED STATES PATENTS

| | | |
|---|---|---|
| 495,241 | Braun | Apr. 11, 1893 |
| 921,338 | Asbury | May 11, 1909 |
| 2,359,612 | Bulsey | Oct. 3, 1944 |
| 2,447,684 | Brown | Aug. 24, 1948 |
| 2,500,251 | Hood | Mar. 14, 1950 |
| 2,628,545 | Kurnick | Feb. 17, 1953 |
| 2,709,223 | Bachelder | May 24, 1955 |
| 2,726,337 | Stava | Dec. 6, 1955 |
| 2,747,480 | Siemens | May 29, 1956 |

FOREIGN PATENTS

| | | |
|---|---|---|
| 502,014 | Great Britain | Mar. 7, 1939 |